Feb. 28, 1967 V. SHANOK ET AL 3,306,308
PIPE SUPPORT
Filed Oct. 27, 1964
FIG.1
FIG.2
FIG.7
FIG.3
FIG.4
FIG.5
FIG.6
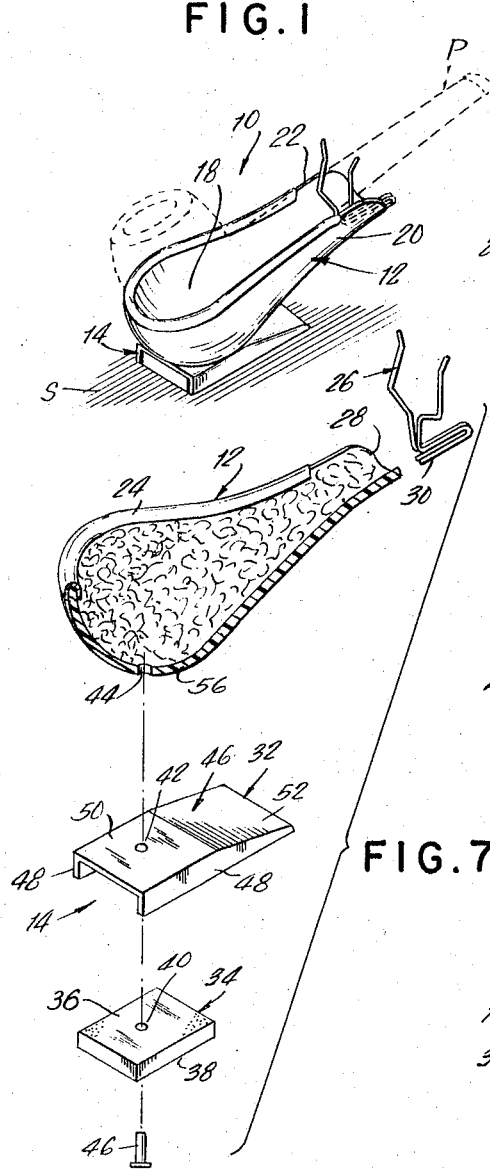
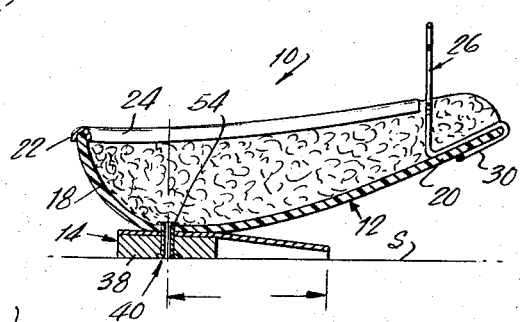
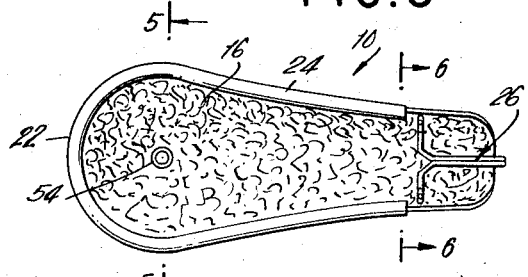
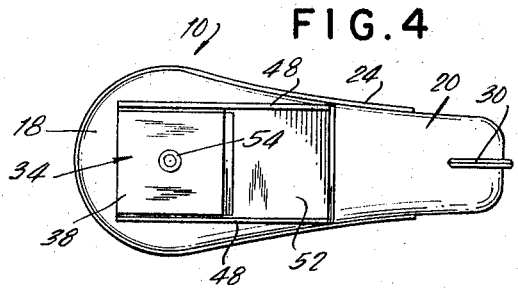
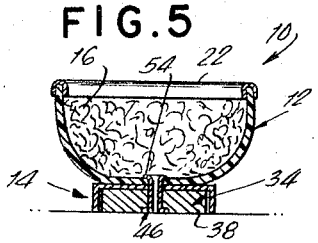
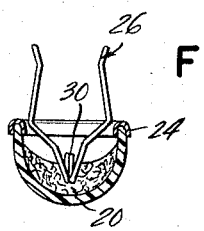
INVENTORS
VICTOR SHANOK
JESSE P. SHANOK
BY
ATTORNEYS United States Patent Office  
3,306,308  
Patented Feb. 28, 1967

3,306,308  
PIPE SUPPORT  
Victor Shanok and Jesse P. Shanok, both of 863 65th St., Brooklyn, N.Y. 11220  
Filed Oct. 27, 1964, Ser. No. 406,735  
1 Claim. (Cl. 131—260)

The present invention relates generally to mounting devices and particularly to mounting devices employable for the support of pipes or the like.

It is an object of the present invention to provide a mounting device for a pipe which although not physically secured to a supporting surface will nevertheless maintain the pipe in predetermined disposition relative to such surface without the possibility of the pipe being inadvertently displaced from the mounting device.

It is another object of the present invention to provide a mounting device for a pipe which is especially suitable for mounting the pipe on the dashboard of an automobile or boat or other moving vehicle whereby the pipe will be prevented from rolling or falling from said supporting surface during movement or motion of the vehicle.

It is a further object of the present invention to provide a pipe mounting device of the described type which can be manufactured at a relatively low cost from readily available material and which can be sold at a relatively low price and yet which will pass a relatively long, useful and efficient life.

Other and further objects and advantages of the present invention will be readily apparent to one skilled in the art, from a consideration of the following specification taken in connection with the appended drawings which illustrate the best mode presently contemplated for carrying out the invention.

In the drawings:

FIGURE 1 is a perspective view of a pipe holder or pipe mounting device pursuant to the present invention;

FIGURE 2 is a longitudinal cross-sectional view through the device shown in FIG. 1 on an enlarged scale;

FIGURE 3 is a top plan view of the device;

FIGURE 4 is a bottom plan view of the device;

FIGURE 5 is a sectional view taken on the line 5—5 of FIG. 3;

FIGURE 6 is a sectional view taken on the line 6—6 of FIG. 3; and

FIGURE 7 is an exploded view of the device with a portion thereof being shown in section.

Referring now to the drawings in detail, there is shown a pipe holder or pipe mounting device 10 pursuant to the present invention.

As here shown the article 10 comprises a pipe holding receptacle 12 provided on a magnetic mounting means 14.

The receptacle 12 is preferably formed of a suitable plastic material and has a flocked or flexible inner surface 16 so as to cushion a pipe P which may be received in the receptacle. The receptacle 12 has an enlarged bowl-shaped portion 18 with an interior configuration complementary to the bowl of the pipe P. An elongated hollow stem portion 20 integral with the bowl portion 18 extends therefrom and has a configuration complementary to the stem of the pipe P so as to accommodate the latter. The receptacle 12 is provided with a continuous upper rim 22 which is covered by a protective rim shield 24 at the bowl-shaped portion 18 and partially at the stem-shaped portion 20. A pipe stem clip 26 is mounted on the free edge 28 of the stem portion 20 as best shown for example in FIG. 2. It will be noted that the edge 28 is not covered by the rim shield 24 so that the U-shaped stem engaging portion 30 of the clip 26 may engage over the free edge portion 28 as best shown in FIG. 2.

As here shown, the magnetic mounting means 14 comprises a keeper 32 formed of a suitable metal and a magnet 34. In the illustrated form of the invention, the magnet 34 is of the ceramic type wherein the magnetic poles are located at the upper and lower faces 36 and 38, respectively, of the magnet 34. A central bore 40 is provided in the magnet 34, said bore being in alignment or registry with a bore 42 provided in the keeper 32 and a bore 44 provided in the bowl 18 of the pipe holding receptacle 12. These bores in combination with a rivet 46 are utilized to mount the receptacle 12 on the magnetic mounting means 14 as hereinafter described in detail. The keeper 32 is a channel shaped member. More specifically, the keeper 32 is provided with a base wall which is generally indicated by the numeral 46 from which there depends opposing flanges 48—48. As here shown, the base wall 46 comprises a magnet mounting or engaging wall portion 50 and a wall portion 52 which is angularly disposed relative to the wall portion 50 and which extends diagonally downwardly therefrom. It will be understood that the magnet retainer portion 50 and the associated portions of flanges 48 constitute a housing for the magnet 38 and the downwardly extending wall portion 52 and the portions of the opposing flanges 48 which are associated therewith constitute a balancing leg or stabilizing arm for the magnet mounting means 14. More specifically, it will be noted that the bore 42 is defined in the magnet retainer portion 50 so that the magnet 34 is received in the magnet retainer constituted by wall 50 and the associated portions of flanges 48 with the magnet face 36 in abutment with the inner or lower face of wall portion 50 viewing FIG. 7 and the aligned bores 40 and 42 are then disposed in alignment with the bore 44, with the rivet 46 then being inserted through the three aligned bores and then being upset as shown in FIGS. 2, 3, 4, and 5. With the magnetic mounting means 14 secured to the bowl 18 in the described manner and as illustrated in FIGS. 1 and 2, it will be noted that the pipe holding receptacle 12 is mounted on the mounting means 14 at the bottom portion 56 of bowl 18 with the stem portion 20 of the receptacle diverting laterally upwardly from the mounting means 14, as best shown in FIG. 2.

In order to releasably retain the article 10 in position on a supporting surface S, said surface being preferably a metallic surface, the pipe holder 10 is disposed on the surface S with the face 38 of the magnet 34 in abutment with the surface S. If the surface S is a metallic magnetizable surface, it will be apparent that there will be a magnetic attraction between the surface and the magnet 34 with the magnetic field between the opposing surfaces of the magnet 34 being completed through the metallic keeper 32 so as to firmly retain the magnet in magnetic engagement with the surface S. It will be noted that in such condition of the article 10, the stabilizing leg 52 extends laterally from the magnet 34 and engages the surface S underneath the upwardly diverging portion of the stem 20 so as to stabilize the article 10 and prevent the latter from falling or rolling over on to the surface S, the leg 52 serving as a balancing leg for this purpose. In the event the surface S is not formed of a magnetizable material, it will be apparent that the stabilizing leg 52 will serve the same function in stabilizing the pipe holder 10 on its supporting surface S. Of course where the supporting surface is formed of a magnetizable material the previously described magnetic attraction will prevent any movement of the pipe holder 10 relative to the surface S as would otherwise occur if the surfaces were contained within a moving vehicle such as a plane, a boat, or an automobile.

Consequently, in view of the foregoing, it will be apparent that the pipe holding article 10 is eminently suitable for holding a pipe on the surface S of a moving vehicle. This is simply accomplished, as previously indicated, by mounting the pipe holding article 10 preferably on a magnetizable surface S so that the magnetic attraction of the magnet 34 therewith will prevent relative movement of the pipe holder along the surface, the leg 52 serving to balance the holder on the surface and prevent the toppling of the holder. The pipe P is simply deposited in the holder 10 as illustrated in FIG. 1 by merely inserting the bowl of the pipe in the bowl portion 18 of the holder with the stem of the pipe engaged in the stem portion 20 of the holder and with the stem also engaged within the spring clip 26 as illustrated in broken line in FIG. 1 to firmly and releasably retain the pipe in position in the pipe holder device 10 which itself is firmly retained in position on the supporting surface S by means of its magnetic mounting means 14.

In view of the foregoing, it will be apparent that there has been illustrated and described a highly novel pipe holder or the like, it being understood however that various changes and modifications may be made therein without however departing from the basic inventive concept thereof as set forth in the appended claim.

We claim:

A pipe holder comprising a receptacle having an open bowl portion and an open stem portion extending from said bowl portion, and magnetic mounting means secured to the bottom of said bowl portion for mounting the latter on a supporting surface, said magnetic mounting means comprising a keeper member secured to the bottom of said bowl, and a ceramic magnet mounted by said keeper, said keeper being a channel shaped member having a base wall provided with two diverging wall portions and opposing flanges at the opposite margins of said base wall, said magnet being secured in surface abutment with one of said wall portions and the other wall portion diverging downwardly from said one wall portion to stabilize said receptacle.

References Cited by the Examiner
UNITED STATES PATENTS

| | | | |
|---|---|---|---|
| D. 70,323 | 8/1926 | Guinn. | |
| 744,635 | 11/1903 | Sinclair et al. | |
| 2,948,283 | 8/1960 | Holderness | 131—260 |
| 2,978,215 | 4/1961 | Shanok et al. | 248—206 |
| 3,189,186 | 6/1965 | Palant | 131—260 X |

SAMUEL KOREN, *Primary Examiner.*

JOSEPH S. REICH, *Examiner.*